United States Patent
Choi

(10) Patent No.: US 10,896,487 B2
(45) Date of Patent: Jan. 19, 2021

(54) METHOD AND APPARATUS FOR REDUCING NOISE

(71) Applicant: Hanwha Techwin Co., Ltd., Seongnam-si (KR)

(72) Inventor: Eun Cheol Choi, Seongnam-si (KR)

(73) Assignee: HANWHA TECHWIN CO.. LTD., Seongnam-si (KR)

( * ) Notice: Subject to any disclaimer, the term of this patent is extended or adjusted under 35 U.S.C. 154(b) by 119 days.

(21) Appl. No.: 16/037,163

(22) Filed: Jul. 17, 2018

(65) Prior Publication Data

US 2019/0244328 A1    Aug. 8, 2019

(30) Foreign Application Priority Data

Feb. 5, 2018  (KR) .................. 10-2018-0014170

(51) Int. Cl.
| | |
|---|---|
| *G06T 5/00* | (2006.01) |
| *G06T 5/50* | (2006.01) |
| *H04N 19/172* | (2014.01) |
| *H04N 19/196* | (2014.01) |
| *H04N 19/139* | (2014.01) |

(52) U.S. Cl.
CPC .............. *G06T 5/002* (2013.01); *G06T 5/50* (2013.01); *G06T 2207/10016* (2013.01); *G06T 2207/20182* (2013.01); *G06T 2207/20201* (2013.01); *H04N 19/139* (2014.11); *H04N 19/172* (2014.11); *H04N 19/198* (2014.11)

(58) Field of Classification Search
CPC .......... G06T 5/002; G06T 5/50; H04N 19/139
USPC ........................................................ 382/236
See application file for complete search history.

(56) References Cited

U.S. PATENT DOCUMENTS

| | | | |
|---|---|---|---|
| 7,145,607 B1 | 12/2006 | Hui | |
| 8,223,839 B2 * | 7/2012 | Kervec | ................. G06T 3/4007 375/240.12 |
| 2006/0139494 A1 | 6/2006 | Zhou et al. | |
| 2007/0263126 A1* | 11/2007 | Chao | ...................... H04N 5/144 348/607 |
| 2010/0027898 A1* | 2/2010 | Lee | ......................... G06T 7/254 382/236 |
| 2010/0225790 A1* | 9/2010 | Sasaki | ...................... G06T 5/50 348/241 |
| 2015/0256804 A1* | 9/2015 | Wen | ........................ G06T 5/002 348/453 |
| 2015/0279006 A1* | 10/2015 | Choi | ...................... G06T 5/002 382/264 |
| 2017/0296033 A1* | 10/2017 | Takahashi | ............ A61B 1/0646 |

(Continued)

FOREIGN PATENT DOCUMENTS

| | | |
|---|---|---|
| KR | 1020060076176 A | 7/2006 |
| KR | 101079299 B1 | 11/2011 |
| KR | 101508386 B1 | 4/2015 |

*Primary Examiner* — Congvan Tran
(74) *Attorney, Agent, or Firm* — Sughrue Mion, PLLC

(57) ABSTRACT

Provided are an apparatus and method of reducing noise of an image. The apparatus for reducing noise of an image includes: a motion detector configured to detect a motion from a current image; a weight setting unit configured to set a weight of the current image based on the motion and a weight of a previous image; and a noise reduction unit configured to apply the weight of the current image to the current image to reduce temporal noise of the current image.

20 Claims, 6 Drawing Sheets

(56) References Cited

U.S. PATENT DOCUMENTS

2018/0061015 A1* 3/2018 Guo .................. H04N 5/21
2019/0108622 A1* 4/2019 Douady-Pleven ...... G06T 5/002

* cited by examiner

METHOD AND APPARATUS FOR REDUCING NOISE

CROSS-REFERENCE TO THE RELATED APPLICATION

This application claims priority from Korean Patent Application No. 10-2018-0014170, filed on Feb. 5, 2018, in the Korean Intellectual Property Office, the disclosure of which is incorporated herein in its entirety by reference.

BACKGROUND

1. Field

Methods and apparatuses consistent with exemplary embodiments of the inventive concept relate to reducing noise in an image.

2. Description of the Related Art

According to a technique for reducing spatial-temporal noise of the related art, a temporal noise reduction and a spatial noise reduction are distinguished from each other, and a higher weight is applied to the temporal noise reduction in a domain with no motion and a higher weight is applied to the spatial noise reduction in a domain with a motion.

SUMMARY

Exemplary embodiments of the inventive concept provide an apparatus and method of reducing noise in an image, capable of improving noise reduction effect and reducing motion blur.

Various aspects of the inventive concept will be set forth in part in the description which follows and, in part, will be apparent from the description, or may be learned by practice of the embodiments.

According to exemplary embodiments, there is provided an apparatus for reducing noise of an image which may include: a motion detector configured to detect a motion from a current image; a weight setting unit configured to set a weight of the current image based on the motion and a weight of a previous image; and a noise reduction unit configured to apply the weight of the current image to the current image to reduce temporal noise of the current image.

The weight setting unit may be configured to set the weight of the current image to be an average of a first weight of the current image corresponding to the motion and the weight of the previous image for the application to the current image, when the first weight of the current image is less than the weight of the previous image.

The weight setting unit may be configured to set the weight of the current image to be unchanged for the application to the current image, when a first weight of the current image corresponding to the motion is equal to or greater than the weight of the previous image.

The weight setting unit may be further configured to set the weight of the current image to be an average of the first weight of the current image and the weight of the previous image for the application to the current image, when the first weight of the current image is less than the weight of the previous image.

The noise reduction unit may be configured to generate an output image that is a weighted sum of the current image and the previous image by using the weight of the current image set based on the motion and the weight of the previous image.

The weight setting unit may be configured to set the weight of the current image to be higher when an amount or level of the motion of the current image is greater than an amount or level of a motion of the previous image than when the amount or level of the motion of the current image is smaller than the amount or level of the motion of the previous image.

The apparatus may further include a memory configured to store the weight of the current image which is used to reduce temporal noise of a next image. Here, the weight setting unit may be configured to reduce bits required to store the weight of the current image, store the weight of the current image in the memory, and reconstruct the bits of the weight of the current image read from the memory to use the weight of the current image.

The motion detector may be configured to detect the motion from pixels with a predetermined interval in the current image, and the weight setting unit is configured to set weights to the pixels, from which the motion is detected, based on the motion and the weight of the previous image, and set one of the weights set to one of two pixels among the pixels to pixels arranged between the two pixels.

The weight setting unit may be configured to match the one of the weights to a group comprising one of the two pixels and pixels between the two pixels, and store the one of the weights in a memory.

The weight setting unit may be configured to set weights to a portion of pixels forming the current image, from which the motion is detected, based on the motion and the weight of the previous image, and set one of the weights set to one of the portion of pixels to pixels not included in the portion of pixels in the current image.

According to exemplary embodiments, there is provided a method of reducing noise of an image which may includes: detecting a motion from a current image; setting a weight of the current image based on the motion and a weight of a previous image; and applying the weight of the current image to the current image to reduce temporal noise of the current image.

The setting the weight of the current image may include, when a first weight of the current image, corresponding to the motion of the current image, is less than the weight of the previous image, setting the weight of the current image to be an average of the first weight of the current image and the weight of the previous image for the application to the current image.

The resetting the weight of the current image may include, when a first weight of the current image, corresponding to the motion of the current image, is equal to or greater than the weight of the previous image, setting the weight of the current image to be unchanged for the application to the current image.

The setting the weight of the current image may further include, when the first weight of the current image is less than the weight of the previous image, setting the weight of the current image to be an average of the first weight of the current image and the weight of the previous image for the application to the current image.

The reducing the temporal noise may include generating an output image that is a weighted sum of the current image and the previous image by using the weight of the current image set based on the motion and the weight of the previous image.

The setting the weight of the current image may further include setting the weight of the current image to be higher when an amount or level of the motion of the current image is greater than an amount or level of a motion of the previous image than when the amount or level of the motion of the current image is smaller than the amount or level of the motion of the previous image.

The detecting the motion may include detecting the motion from pixels with a predetermined interval in the current image, and the setting the weight may include: setting weights to the pixels, from which the motion is detected, based on the motion and the weight of the previous image; and setting one of the weights set to of one of two pixels among the pixels to pixels arranged between the two pixels.

The method may further include matching the one of the weights to a group comprising one of the two pixels and pixels between the two pixels, and storing the one of the weights in a memory.

The method may further include: storing the weight of the current image, which is used to reduce temporal noise of a next image, in a memory after reducing bits of the weight of the current image; and reconstructing the bits of the weight of the current image read from the memory.

According to exemplary embodiments, a non-transitory computer-readable recording medium includes a program thereon for executing the method of reducing noise.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
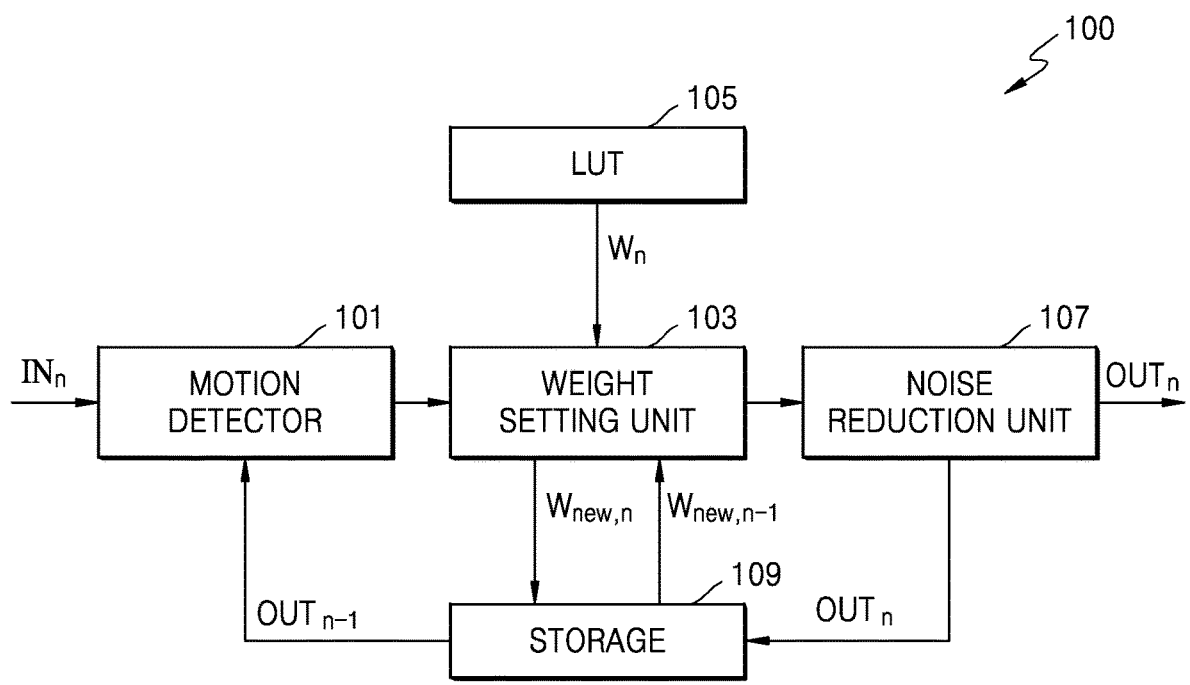
FIG. 1 is a schematic diagram of an apparatus for reducing temporal noise in an image, according to an embodiment.

All embodiments described herein are exemplary illustrating the principles of the inventive concept without being limited thereto. In this regard, these embodiments may have different forms and should not be construed as being limited to the descriptions set forth herein. Accordingly, the embodiments are merely described below, by referring to the drawings, to explain various aspects of the inventive concept. As used herein, the term "and/or" includes any and all combinations of one or more of the associated listed items. In the description, certain detailed explanations of the related art are omitted when it is deemed that they may unnecessarily obscure the essence of the present disclosure.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It will be understood that although the terms "first," "second," etc. may be used herein to describe various components, these components should not be limited by these terms. These components are only used to distinguish one component from another. For example, according to various embodiments, a first component may be denoted a second component, and vice versa without departing from the scope of the present disclosure.

The terms used herein are merely used to describe particular embodiments, and are not intended to limit the inventive concept. An expression used in the singular encompasses the expression of the plural, unless it has a clearly different meaning in the context. It will be further understood that the terms "comprise" and/or "comprising" when used in this specification, specify the presence of stated elements, steps, operations, and/or devices, but do not preclude the presence or addition of one or more other elements, steps, operations, and/or devices thereof.

Unless otherwise defined, all terms (including technical and scientific terms) used herein have the same meanings as commonly understood by one of ordinary skill in the art to which the present disclosure belongs. It will be further understood that terms defined in commonly used dictionaries should not be interpreted in an idealized or excessive sense unless expressly and specifically defined.

FIG. 1 is a schematic diagram of an apparatus for reducing temporal noise in an image, according to an embodiment.

Referring to FIG. 1, an apparatus for reducing temporal noise of an image (hereinafter, referred to as 'temporal noise reducing apparatus') 100 may include a motion detector 101, a weight setting unit 103, a lookup table (LUT) 105, a noise reduction unit 107, and a storage 109.

The temporal noise reducing apparatus 100 may be implemented in a processor, and the processor may be realized by any number of hardware and/or software components configured to perform specified functions. For example, the processor may denote a data processing device built in hardware, and includes a physically structured circuit for executing functions expressed as code or commands included in a program. As an example of the data processing device built into hardware, there is a microprocessor, a CPU, a processor core, a multiprocessor, an application-specific integrated circuit (ASIC), a field programmable gate array (FPGA), etc., but the scope of the inventive concept is not limited thereto.

The motion detector 101 calculates a motion level in units of pixels from an image input in units of frames, and calculates and outputs a detection value MDV indicating the motion level. Hereinafter, an image that is currently input to be analyzed (hereinafter, referred to as 'current image') $IN_n$, will be described as an example, for convenience of description.

The motion detector 101 may detect motion information about the current image $IN_n$ based on a difference between the current image $IN_n$ and a previous image prior to the current image $IN_n$. Here, the previous image is a previous output image $OUT_{n-1}$, in which temporal noise is reduced.

In the embodiment, the motion detector 101 may calculate a value SAD(i) with respect to each pixel. The value SAD(i) is an average value of the difference between the current image $IN_n$ and the previous image $OUT_{n-1}$, within a local window WIN having a size of N×M. A current pixel is a center pixel among the pixels covered by the local window WIN, and the current pixel is a pixel, a value of which is to be calculated.

Figure 2:
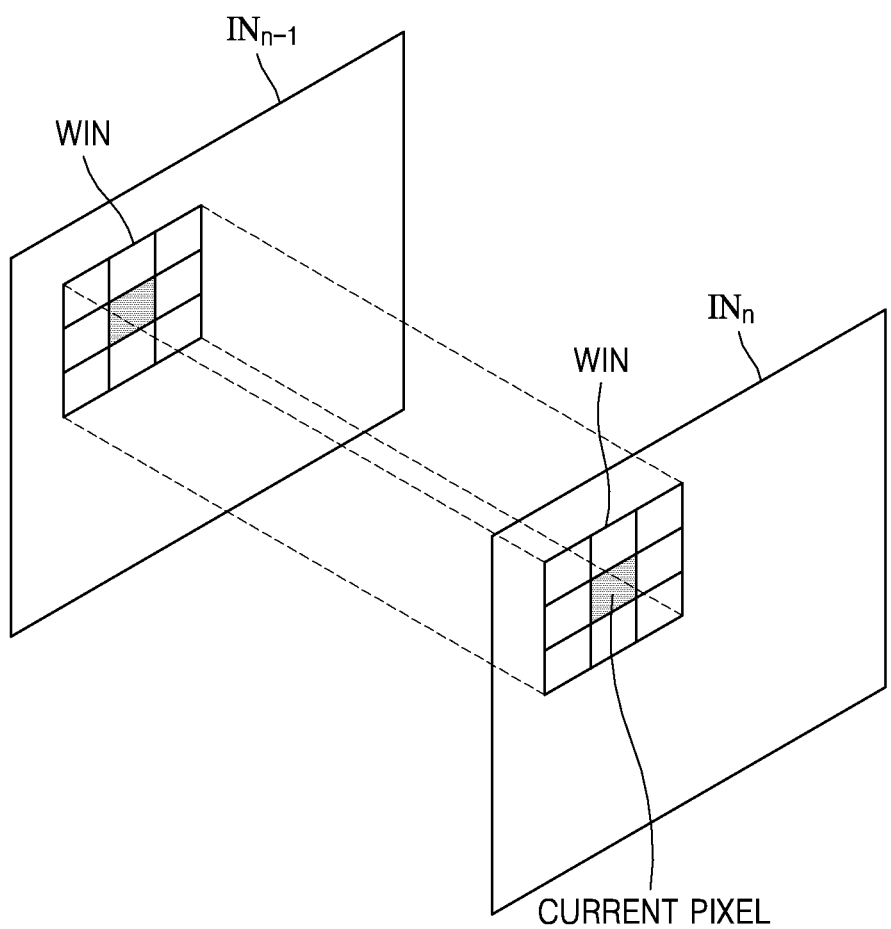
FIG. 2 is a diagram showing an example of a method of detecting a motion, according to an embodiment.

FIG. 2 shows local windows WIN corresponding to each other in the current image $IN_n$ and the previous image $OUT_{n-1}$ for calculating the value SAD(i). The motion detector 101 may calculate the value SDA(i), by using the center pixel in the local window WIN as a current pixel. The motion detector 101 may calculate a motion level based on the value SAD(i), and may calculate a motion detection value MDV indicating the motion level.

The weight setting unit 103 may set a first weight W corresponding to the motion detection value MDV of the pixel, from which the motion is detected, by using the LUT 105. Equation 1 below represents that the first weight W of a pixel at a location (i,j) is set by a function using the motion detection value MDV as a variable.

$$W(i,j)=f(MDV) \quad (1)$$

The first weight W may vary depending on the motion level. That is, when the motion level increases, the first weight W may be set to be large. A variation ratio of the first weight W may be in proportion to a variation ratio of the motion level.

The LUT 105 may be a table or a graph indicating a relationship between the motion detection value MDV, according to the motion detection result based on pixels, and the first weight W. The LUT 105 may be stored in a storage unit such as a memory.

Figure 3:
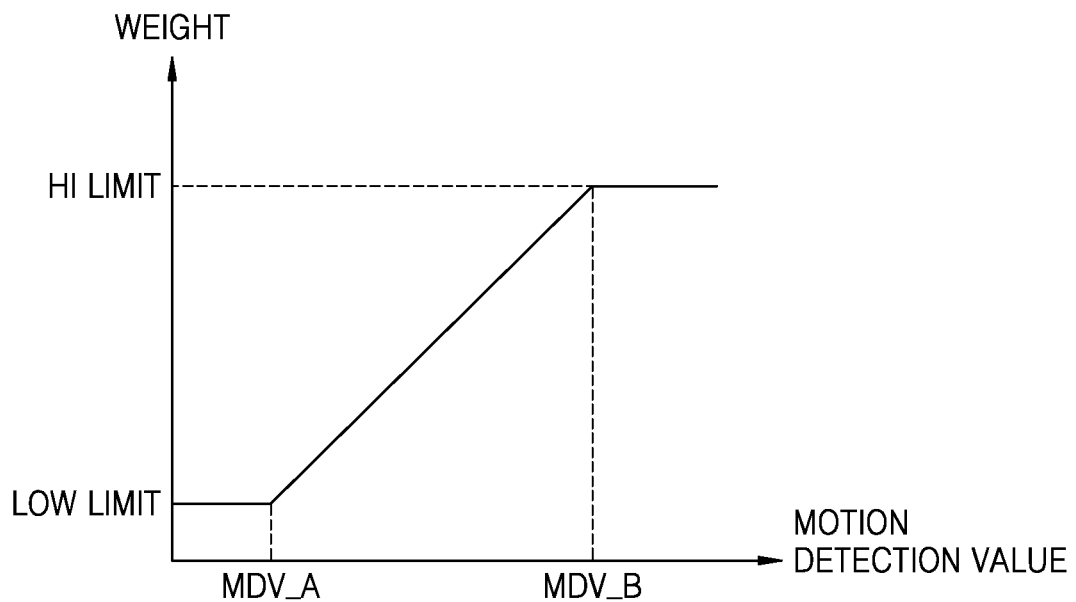
FIG. 3 is a diagram showing an example of a graph, as a lookup table according to an embodiment.

FIG. 3 shows a graph as an example of the LUT according to the embodiment. In the graph of FIG. 3, the x-axis represents the motion detection value MDV according to the result of detecting the motion based on pixels, and the y-axis represents the first weight W.

The first weight W has a value between a low limit and a high limit, and is close to the high limit when the motion level increases and is close to the low limit when the motion level decreases.

The motion detection value MDV equal to or less than a motion minimum value MDV_A is set to have the lowest weight (low limit), and the motion detection value MDV equal to or greater than a motion maximum value MDV_B may be set to have the highest weight (high limit). The motion detection value between the motion minimum value MDV_A and the motion maximum value MDV_B may be set to have the first weight W between the low limit and the high limit of the weight.

FIG. 3 shows a one-dimensional graph having the motion minimum value MDV_A and the motion maximum value MDV_B as reference values, but the embodiments are not limited thereto. For example, a plurality of reference values with respect to the motion detection value may be set, and an LUT having different graphs, e.g., one-dimensional, two-dimensional, etc., among the reference values may be generated.

In one embodiment, there may be a plurality of LUTs representing the first weight with respect to the motion detection value according to illuminance and/or sensor gain. In this case, a component for detecting an illuminance and/or detecting a sensor gain is additionally provided, and the weight setting unit 103 may set the first weight after selecting an LUT according to the result of detecting the illuminance and/or the sensor gain.

The weight setting unit 103 may set a first weight $W_n$ of the current image $IN_n$ by using a weight of the previous image $IN_{n-1}$. The weight setting unit 103 may set a second weight $W_{new,n}$ of the current image $IN_n$, which is obtained by adjusting the first weight $W_n$ of the current image $IN_n$ by using a second weight Wnew,n-1 set with respect to the previous image $IN_{n-1}$. The weight setting unit 103 may compare the first weight $W_n$ of the current image $IN_n$ with the second weight $W_{new,n-1}$ of the previous image $IN_{n-1}$.

$$\begin{aligned}Wnew, n(i, j) &= f(MDVn, Wnew, n\text{-}1) \\ &= \frac{f(MDVn) + Wnew, n\text{-}1}{2}, \text{ if} \\ & \quad f(MDVn) < Wnew, n\text{-}1 \\ &= f(MDVn), \text{else}\end{aligned} \quad (2)$$

As expressed in Equation 2 above, when the first weight $W_n$ of the current image $IN_n$ is less than the second weight $W_{new,n-1}$ of the previous image $IN_{n-1}$, the weight setting unit 103 may set an average of the first weight $W_n$ of the current image $IN_n$ and the second weight $W_{new,n-1}$ of the previous image $IN_{n-1}$ as the second weight $W_{new,n}$ of the current image $IN_n$. When the first weight $W_n$ of the current image $IN_n$ is equal to or greater than the second weight $W_{new,n-1}$ of the previous image the weight setting unit 103 may set the first weight $W_n$ of the current image $IN_n$ as the second weight Wnew,n of the current image $IN_n$.

When the first weight $W_n$ of the current image $IN_n$ is less than the second weight $W_{new,n-1}$ of the previous image $IN_{n-1}$, it denotes that there was a motion in the past. On the contrary, when the first weight $W_n$ of the current image $IN_n$ is equal to or greater than the second weight $W_{new,n-1}$ of the previous image it may be determined that a new motion has occurred.

The weight setting unit 103 may store the second weight $W_{new,n}$ of the current image $IN_n$ in the storage 109.

The noise reduction unit 107 may reduce temporal noise of the current image $IN_n$ by using the second weight $W_{new,n}$ of the current image $IN_n$.

$$OUT_n = W_{new,n} \times IN_n + (1 - W_{new,n}) \times OUT_{n-1} \quad (3)$$

As shown in Equation 3 above, the noise reduction unit 107 may reduce the temporal noise by performing a weighted sum of the current image $IN_n$ and the previous output image $OUT_{n-1}$ by using the second weight $W_{new,n}$ of the current image $IN_n$. An output image $OUT_n$ obtained by reducing the temporal noise from the current image $IN_n$ may be stored in the storage 109.

The storage 109 may store the output image $OUT_n$, from which the temporal noise is reduced, of the current image $IN_n$, and the second weight $W_{new,n}$. The output image $OUT_n$ of the current image $IN_n$ may be used as a previous image of a next image $IN_{n+1}$.

According to the embodiments, only the second weight $W_{new,n}$, in which motion information of previous images is accumulated, is stored in the storage 109, and thus, there is no need to store motion information of all the past images, and a storage capacity of the storage 109 may be saved.

The storage 109 may include a first memory for storing the output image $OUT_n$ and a second memory for storing the second weight $W_{new,n}$. The first memory and the second memory may be separate memories, or may be one partitioned memory. The second weight $W_{new,n}$ may be stored after matching to a corresponding pixel.

The first memory may be a frame memory. The first memory may store image data of 8 bits per pixel.

In one embodiment, the second memory may store the second weight $W_{new,n}$ of a predetermined bit. For example, the second weight $W_{new,n}$ may be stored in the second memory as 8 bits per pixel. In another embodiment, bits of the second weight $W_{new,n}$ are transformed to decrease, and thus, the second weight $W_{new,n}$ of less bits (e.g., 4 bits) than 8 bits may be stored in the second memory as shown in Equation 4. In this Equation 4, 8 is added to the second weight $W_{new,n}$ for round off purposes for bit conversion from the 8-bit second weight into a 4-bit second weight.

$$W_{new,n}(i,j), 4\text{ bits} = (W_{new,n} + 8)/16 \quad (4)$$

According to the above embodiment, the motion detection, and setting of the first weight and the second weight are performed with respect to each of all pixels in the image.

In another embodiment, the motion detector 101 may calculate the motion detection value with respect to only some pixels of an image, for example, some pixels with a predetermined interval. In this case, the number of pixels, from which the motion is detected, is reduced, and thus, a calculation amount and a calculation time may be reduced.

Figure 4:
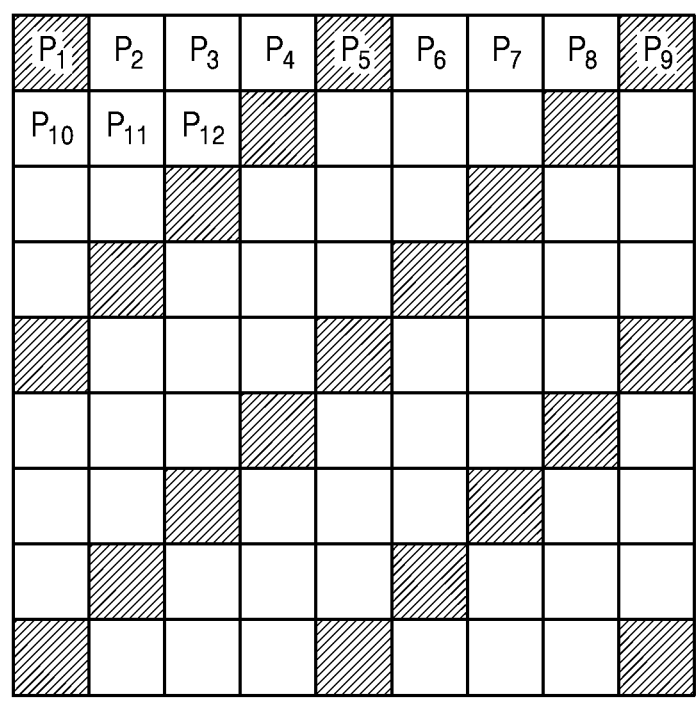
FIG. 4 is a diagram showing an example of detecting a motion according to an embodiment.

FIG. 4 is a diagram showing an example of detecting a motion according to an embodiment. Referring to FIG. 4, when the current image $IN_n$ has a resolution of 9×9 pixels, the motion detector 101 may detect the motion only from the pixels arranged with a predetermined interval, e.g., a first pixel $P_1$, a fifth pixel $P_5$, and a ninth pixel $P_9$.

The weight setting unit 103 calculates first weights with respect to the pixels $P_1, P_5, P_9, \ldots$, from which the motion is detected, in the current image, compares the first weights with the second weights set with respect to the corresponding pixels in the previous image, and adjusts the first weights calculated in the current image to second weights. The weight setting unit 103 may set a second weight with respect to pixels arranged between the pixels $P_1, P_5, P_9, \ldots$, from which the motion is detected, wherein the second weight is the second weight of one of two pixels located before and after the interposed pixels. For example, the second weight set with respect to the first pixel $P_1$ is applied to the second to fourth pixels $P_2$ to $P_4$ between the pixels $P_1$ and $P_5$, and the second weight set with respect to the fifth pixel $P_5$ may be applied to the sixth to eighth pixels $P_6$ to $P_8$ between the pixels $P_5$ and $P_9$.

The noise reduction unit 107 may reduce the temporal noise by performing a weighted sum of the current image $IN_n$ and the previous output image $OUT_{n-1}$ by using the second weight $W_{new,n}$ of the current image $IN_n$.

The storage 109 may store the output image $OUT_n$, in which the temporal noise is reduced, of the current image $IN_n$, and the second weight $W_{new,n}$. Here, one second weight $W_{new,n}$ of 8 bits may be stored with respect to a group unit including the predetermined number of successive pixels in the second memory. For example, one second weight may be stored after being matched to a group including the first to fourth pixels $P_1$ to $P_4$, and one second weight may be stored after matching to a group including the fifth to eighth pixels $P_5$ to $P_8$. Here, the bits of the second weight $W_{new,n}$ may be transformed to decrease and the second weight $W_{new,n}$ may be stored in less bits (e.g., 4 bits) than 8 bits.

According to the embodiment, the number of second weights $W_{new,n}$ stored in the memory may be reduced, and/or bits of the second weight $W_{new,n}$ may be reduced to save the capacity of the entire memory.

In addition, the motion detector 101 may detect a motion in the current image $IN_n$ by reading an output image $OUT_{n-1}$, in which the temporal noise is reduced, of the previous image $IN_{n-1}$ from the first memory of the storage 109.

The weight setting unit 103 may set the second weight $W_{new,n}$ of the current image $IN_n$ by reading the second weight $W_{new,n-1}$ of the previous image $IN_{n-1}$ from the second memory of the storage 109. Here, when the bits of the second weight $W_{new,n}$ of the current image $IN_n$ decrease, the weight setting unit 103 may reconstruct the bits of the second weight $W_{new,n}$ as shown in Equation 5. In this equation, 8 is added for round off purposes for bit conversion from the 4-bit second weight into the 8-bit second weight.

$$W_{new,n}(i,j) = f(MDV_n, \{(W_{new,n-1}, 4\text{ bits}) \times 16 + 8\}) \quad (5)$$

Accordingly, an accuracy in reducing the temporal noise may be improved while saving the storage capacity.

When the temporal noise is reduced in the image with motion, motion blur may occur. Therefore, when there is a motion, the weight may be set close to 1 to increase the weight of the current image, and when there is no motion, the weight is set close to 0, and thus the previous image may be reflected more. That is, when there is a motion, noise is reduced by mainly using the current image in order to prevent the motion blur, and when there is no motion, an original signal may be reconstructed by increasing the weight of the previous image to be greater than that of the current image.

Ideally, when there is a motion, the current image may be only used when the first weight is 1, and then, the motion blur does not occur. However, since it is difficult to perfectly detect the motion, the first weight mostly has a value close to 1, not necessarily 1, even when there is a motion. In this case, information about the previous image is essentially reflected, and thus, the motion blur occurs.

According to the embodiment, in order to reduce the motion blur that occurs when the information about the previous image is used in reducing the temporal noise, an optimal weight is newly defined to reduce the motion blur.

It will be assumed that a motion occurs and there is no further motion. That is, a brightness of an arbitrary pixel is 100 in a 0-th image, a motion occurs and the brightness of the pixel is 10 in a first image, and after that, there is no motion. In this case, after the first image, a true value of an output value from the pixel is 10.

Here, first weights $W_n$ calculated with respect to a series of images based on differences between the current image and the previous image are $W_1=0.9$, $W_2=0.1$, $W_3=0.1$, ..., and second weights $W_{new,n}$ are $W_{new,1}=0.9$, $W_{new,2}=0.5$, $W_{new,3}=0.3$, .... That is, when n is 2, the second weight greater than 0.1 is applied, and as n increases, the second weight is gradually reduced to a value close to 0.1.

Figure 5:
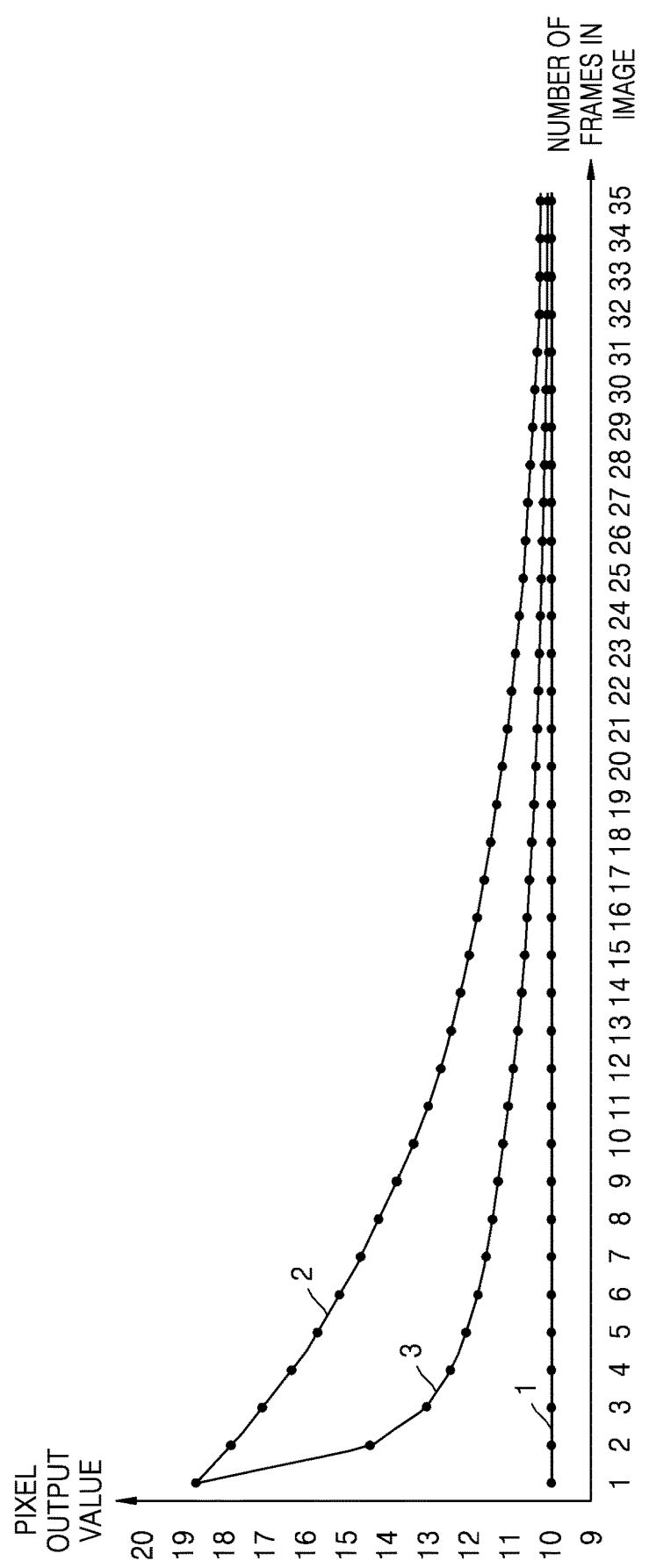
FIG. 5 is a diagram showing convergence of output values from pixels with respect to the number of images, to which a weight calculated according to an embodiment is applied.

FIG. 5 is a diagram showing convergence of pixel output values with respect to the number of images to which the weight calculated according to the embodiment is applied.

In FIG. 5, graph 1 is a graph indicating true values of pixel output values, graph 2 is a convergence graph of the output values from the pixels when the first weight $W_n$ is applied to Equation 3, and graph 3 is a convergence graph of the output values from the pixels when the second weight $W_{new,n}$ is applied to Equation 3.

Referring to FIG. 5, until the output values of the pixels converge to 11 or less, which is an error range of 10% with respect to 10, that is, the true value, twenty two (22) images are necessary in the graph 2 and twelve (12) images are only necessary in the graph 3. Also, until the output values of the pixels converge to 12 or less, which is an error range of 20% of the true value, only five (5) images are necessary in the graph 3.

That is, according to the embodiment, when there is a recent motion even when there is no motion in the current image, a weight that is greater than that of a case where there is no motion is applied to increase convergence speed to the true value of the pixels, that is, the number of images that are necessary to converge to the true value of the pixels may be reduced, and the motion blur may be reduced.

Figure 6:
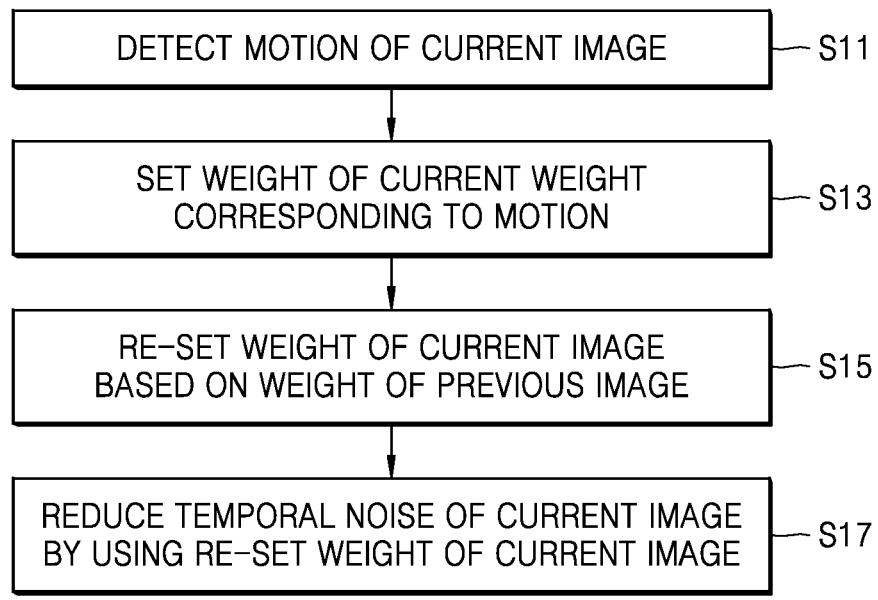
FIGS. 6 and 7 are diagrams illustrating a method of reducing temporal noise in an image, according to an embodiment.
Figure 7:
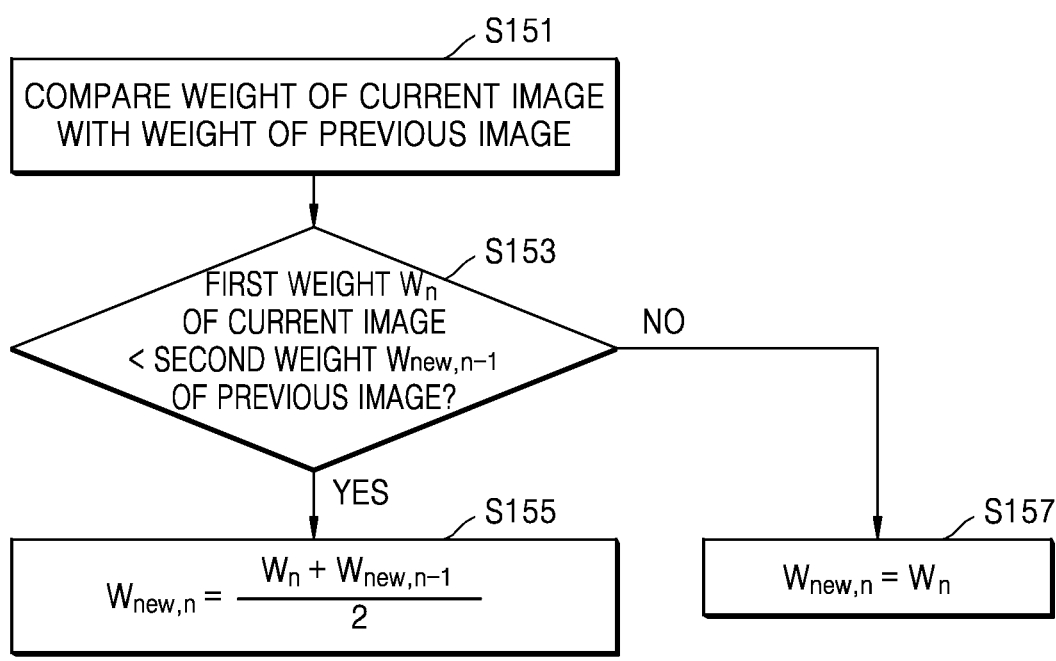

FIGS. 6 and 7 are diagrams illustrating a method of reducing temporal noise in an image according to an embodiment. The method of reducing the temporal noise of the image illustrated in FIGS. 6 and 7 may be performed by the temporal noise reducing apparatus 100. Hereinafter, descriptions about the elements described above will be omitted.

The temporal noise reducing apparatus 100 may detect a motion in units of pixels from an input current image (S11). The temporal noise reducing apparatus 100 may detect the motion from each of all the pixels in the current image, or only from some pixels arranged with a predetermined interval.

The temporal noise reducing apparatus 100 may detect motion information about the current image based on differences between the current image and the previous image. Here, the previous image may be an image in which temporal noise is reduced. The motion information may be an average value of the differences between the current image and the previous image, within a local region.

The temporal noise reducing apparatus 100 may set the first weight $W_n$ with respect to the pixel, in which the motion is detected, for reducing the temporal noise in the current image (S13). The first weight may vary depending on the motion level. That is, when the motion level increases, the first weight may be set to be large. A variation ratio of the first weight may be in proportion to a variation ratio of the motion level. The temporal noise reducing apparatus 100 may use a LUT showing a relationship between the motion level and the first weight.

The temporal noise reducing apparatus 100 may determine the second weight $W_{new,n}$ by adjusting the first weight $W_n$ of the current image based on the weight of the previous image (S15). To do this, the first weight $W_n$ of the current pixel in the current image may be compared with the second weight $W_{new,n-1}$ of a corresponding pixel in the previous image (S151). When the first weight $W_n$ of the current pixel in the current image is less than the second weight $W_{new,n-1}$ of the corresponding pixel in the previous image (S153), an average between the first weight $W_n$ of the current pixel in the current image and the second weight $W_{new,n-1}$ of the corresponding pixel in the previous image may be set as the second weight $W_{new,n}$ of the current image (S155). When the first weight $W_n$ of the current pixel in the current image is equal to or greater than the second weight $W_{new,n-1}$ of the corresponding pixel in the previous image (S153), the first weight $W_n$ of the current pixel in the current image may be set as the second weight $W_{new,n}$ of the current pixel in the current image (S157).

In one embodiment, when the motion is detected from all pixels in the current image, the first weight $W_n$ and the second weight $W_{new,n}$ may be set respectively to each of the pixels. In another embodiment, when the motion is detected from only some pixels (pixels arranged with a predetermined interval) in the current image, the first weight $W_n$ and the second weight $W_{new,n}$ may be set only for the pixels in which the motion is detected. In this case, the second weight $W_{new,n}$ set with respect to one of the two pixels in which the motion is detected may be identically set to pixels arranged between two pixels in which the motion is detected.

The second weight $W_{new,n}$ may be stored in the storage. In one embodiment, the second weight $W_{new,n}$ may be stored in the storage after being matched to a corresponding pixel. In another embodiment, the second weight $W_{new,n}$ of the same value may match to a predetermined number of pixels, and may be stored in the storage. In another embodiment, the bits of the second weight $W_{new,n}$ may be transformed to have reduced bits, and then stored.

The temporal noise reducing apparatus 100 may reduce the temporal noise of the current image by using the second weight $W_{new,n}$ of the current image (S17). The temporal noise reducing apparatus 100 may reduce the temporal noise by applying the second weight $W_{new,n}$ to the current image and applying a weight $(1-W_{new,n})$ to the previous output image $OUT_{n-1}$, and then by performing a weighted sum of the current image and the previous output image. The temporal noise reducing apparatus 100 may reconstruct the bits, when the bits of the second weight $W_{new,n}$ are reduced and stored. An output image obtained by reducing the temporal noise from the current image may be stored in the storage.

Figure 8:
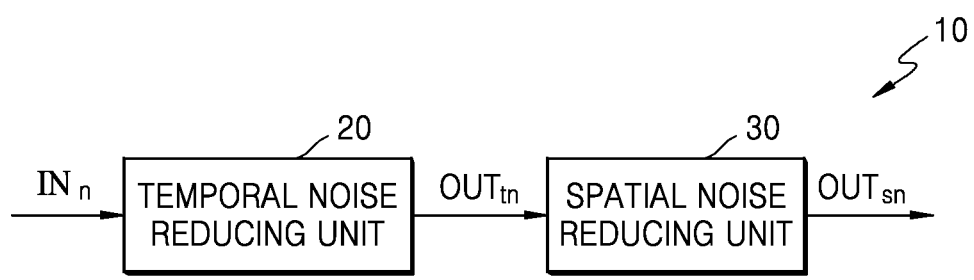
FIG. 8 is a diagram of a spatial-temporal noise reducing apparatus, to which a temporal noise reducing apparatus is applied, according to an embodiment.

FIG. 8 is a diagram of a spatial-temporal noise reducing apparatus 10, to which a temporal noise reducing apparatus is applied, according to an embodiment.

Referring to FIG. 8, the spatial-temporal noise reducing apparatus 10 may include a temporal noise reducing unit 20 and a spatial noise reducing unit 30.

A video image (or moving picture image) is input to a noise reducing apparatus 1 in units of frames.

The temporal noise reducing unit 20 may remove the temporal noise based on motion information about a current image and a previous image. The temporal noise reducing apparatus 100 described above may be used as the temporal noise reducing unit 20. The temporal noise reducing unit 20 may set a first weight for reducing the temporal noise of the current image based on a difference between the current image and the previous image in which the temporal noise is reduced, and may set a second weight of the current image by comparing the first weight of the current image with a second weight of the previous image. The temporal noise reducing unit 20 may generate and output a first output image $OUT_{tn}$ by reducing the temporal noise of the current image by using the second weight of the current image.

The spatial noise reducing unit 30 may generate and output a second output image $OUT_{sn}$ that is obtained by reducing spatial noise from the first output image $OUT_{tn}$ based on similarity and/or motion information about pixels around the current pixel in the first output image $OUT_{tn}$, in which the temporal noise is reduced.

That is, according to the embodiments, history about motion information about a plurality of past images is not necessary, but past motion history may be reflected in the reduction of the temporal image by using the second weight of a direct previous image. Thus, the motion blur may be reduced while saving the capacity of the storage unit.

The images or videos obtained by an image sensor have a variety kinds of noise generated from the sensor and/or circuits. According to the embodiments, the noise is reduced by correlation among images. The embodiments may be applied to various devices such as a surveillance camera including a visual camera obtaining images or videos, a thermal camera, a special-purpose camera, etc., a wireless communication device, a personal digital assistant (PDA), a laptop computer, a desktop computer, a camcorder, a digital camera, a closed circuit TV (CCTV), a digital recording apparatus, a network-enable digital television, a portable phone, a cellular phone, a satellite phone, a camera phone, a bi-directional communication device, etc.

The spatial-temporal noise reducing apparatus and method according to the embodiments may be implemented as computer-readable code in a non-transitory computer-readable recording medium. The computer-readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the embodiments may be easily construed by programmers skilled in the art to which the embodiments pertain.

According to the embodiments, the temporal noise reducing effect may be improved by reducing the motion blur.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope of the inventive concept as defined by the following claims.

What is claimed is:

1. An apparatus for reducing noise of an image, the apparatus comprising at least one processor to implement:
   a motion detector configured to detect a motion from a current image;
   a weight setting unit configured to set a weight of the current image to be an average of a first weight corresponding to the motion and a weight of a previous image, when the first weight of the current image is less than the weight of the previous image; and
   a noise reduction unit configured to apply the average of the first weight and the weight of the previous image to the current image to reduce temporal noise of the current image.

2. The apparatus of claim 1, wherein the weight setting unit is further configured to set the weight of the current image to be unchanged so that the noise reduction unit applies the unchanged weight to the current image, when the first weight of the current image corresponding to the motion is equal to or greater than the weight of the previous image.

3. The apparatus of claim 1, wherein the noise reduction unit is configured to generate an output image that is a weighted sum of the current image and the previous image by using the average of the first weight and the weight of the previous image.

4. The apparatus of claim 3, wherein the weight setting unit is configured to set the weight of the current image to be higher when an amount or level of the motion of the current image is greater than an amount or level of a motion of the previous image than when the amount or level of the motion of the current image is smaller than the amount or level of the motion of the previous image.

5. The apparatus of claim 1, further comprising a memory configured to store the average of the first weight and the weight of the previous image which is used to reduce temporal noise of a next image,
   wherein the weight setting unit is configured to reduce bits required to store the average, store the average in the memory, and reconstruct the bits of the average read from the memory to use the average.

6. The apparatus of claim 1, wherein the motion detector is configured to detect the motion from pixels with a predetermined interval in the current image, and the weight setting unit is configured to set weights to the pixels, from which the motion is detected, based on the motion and the weight of the previous image, and set one of the weights set to one of two pixels among the pixels to pixels arranged between the two pixels.

7. The apparatus of claim 6, wherein the weight setting unit is configured to match the one of the weights to a group comprising one of the two pixels and pixels between the two pixels, and store the one of the weights in a memory.

8. The apparatus of claim 1, wherein the weight setting unit is configured to set weights to a portion of pixels forming the current image, from which the motion is detected, based on the motion and the weight of the previous image, and set one of the weights set to one of the portion of pixels to pixels not included in the portion of pixels in the current image.

9. The apparatus of claim 1, wherein the motion detector is configured to calculate a motion detection value in units of pixels based on differences between corresponding pixels in the current image and the previous image.

10. The apparatus of claim 9, wherein the motion detector is further configured to calculate an average value of the differences between the corresponding pixels in the current image and the previous image within a local window, and calculate a motion detection value corresponding to the average value.

11. A method of reducing noise of an image, the method comprising:

detecting a motion from a current image;

setting a weight of the current image to be an average of a first weight corresponding to the motion and a weight of a previous image, when the first weight of the current image is less than the weight of the previous image; and applying the average of the first weight and the weight of the previous image to the current image to reduce temporal noise of the current image.

12. The method of claim 11, wherein the setting the weight of the current image comprises, when the first weight of the current image corresponding to the motion is equal to or greater than the weight of the previous image, setting the weight of the current image to be unchanged so that the unchanged weight to the current image is applied to the current image to reduce temporal noise of the current image.

13. The method of claim 11, wherein the reducing the temporal noise comprises generating an output image that is a weighted sum of the current image and the previous image by using the average of the first weight and the weight of the previous image.

14. The method of claim 13, wherein the setting the weight of the current image further comprises setting the weight of the current image to be higher when an amount or level of the motion of the current image is greater than an amount or level of a motion of the previous image than when the amount or level of the motion of the current image is smaller than the amount or level of the motion of the previous image.

15. The method of claim 11, wherein the detecting the motion comprises detecting the motion from pixels with a predetermined interval in the current image, and wherein the setting the weight of the current image comprises:

setting weights to the pixels, from which the motion is detected, based on the motion and the weight of the previous image; and setting one of the weights set to of one of two pixels among the pixels to pixels arranged between the two pixels.

16. The method of claim 15, further comprising matching the one of the weights to a group comprising one of the two pixels and pixels between the two pixels, and storing the one of the weights in a memory.

17. The method of claim 11, further comprising:

storing the average of the first weight and the weight of the previous image, which is used to reduce temporal noise of a next image, in a memory after reducing bits of the average; and reconstructing the bits of the average read from the memory.

18. The method of claim 11, wherein the setting the weight of the current image comprises:

setting weights to a portion of pixels forming the current image, from which the motion is detected, based on the motion and the weight of the previous image; and setting one of the weights set to one of the portion of pixels to pixels not included in the portion of pixels in the current image.

19. The method of claim 11, wherein the detecting the motion comprises calculating a motion detection value in units of pixels based on differences between corresponding pixels in the current image and the previous image.

20. The method of claim 11, further comprising:

storing the set weight of the current image in a memory after reducing 8 bits of the set weight of the current image into 4 bits by using a following equation, $W\text{new},n(i,j),4\text{ bit}=(W\text{new},n+8)/16;\text{and}$ reconstructing the 8 bits of the set weight of the current image from the 4 bits read from the memory by using a following equation, $W\text{new},n(i,j)=f(MDVn,\{(W\text{new},n-1,4\text{bits})\times16+8\}).$

* * * * *